United States Patent
Hara

(10) Patent No.: US 10,567,105 B2
(45) Date of Patent: Feb. 18, 2020

(54) BAND IDENTIFYING CIRCUIT, WAVELENGTH-MULTIPLEXED OPTICAL SIGNAL TRANSMISSION DEVICE, WAVELENGTH-MULTIPLEXED OPTICAL SIGNAL TRANSMISSION SYSTEM, AND BAND IDENTIFYING METHOD

(71) Applicant: NEC Corporation, Minato-ku, Tokyo (JP)

(72) Inventor: Yasushi Hara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/072,554

(22) PCT Filed: Feb. 1, 2017

(86) PCT No.: PCT/JP2017/003588
§ 371 (c)(1),
(2) Date: Jul. 25, 2018

(87) PCT Pub. No.: WO2017/135301
PCT Pub. Date: Aug. 10, 2017

(65) Prior Publication Data
US 2019/0036636 A1 Jan. 31, 2019

(30) Foreign Application Priority Data
Feb. 2, 2016 (JP) .................................. 2016-017632

(51) Int. Cl.
*H04J 14/02* (2006.01)
*H04B 10/079* (2013.01)
(52) U.S. Cl.
CPC .... *H04J 14/0224* (2013.01); *H04B 10/07957* (2013.01); *H04J 14/0258* (2013.01)

(58) Field of Classification Search
CPC combination set(s) only.
See application file for complete search history.

(56) References Cited

U.S. PATENT DOCUMENTS

| | | | |
|---|---|---|---|
| 2003/0147585 A1* | 8/2003 | Kikuchi | H04J 14/02 385/24 |
| 2004/0091266 A1* | 5/2004 | Okuno | H04J 14/02 398/82 |

(Continued)

FOREIGN PATENT DOCUMENTS

| | | |
|---|---|---|
| EP | 1770888 A2 | 4/2007 |
| JP | H09-224016 | 8/1997 |

(Continued)

OTHER PUBLICATIONS

International Search Report for PCT Application No. PCT/JP2017/003588, dated Mar. 28, 2017.

(Continued)

*Primary Examiner* — Omar S Ismail

(57) ABSTRACT

In order to identify occupied bands in an optical transmitter with high accuracy, a band identifying circuit includes an optical intensity controller configured to change, by a prescribed level, an optical intensity of an optical signal outputted from a target-of-identification optical transmitter among a plurality of optical signals respectively outputted from a plurality of optical transmitters, constituting a wavelength-multiplexed optical signal, and having mutually different wavelengths, a spectrum acquisition circuit configured to measure an optical intensity of each wavelength of the wavelength-multiplexed optical signal and output a result of the measurement as a spectrum, and a band identifier configured to identify a band occupied by the target-of-identification optical transmitter, based on a change amount of the outputted spectrum.

20 Claims, 7 Drawing Sheets

(56) References Cited

U.S. PATENT DOCUMENTS

| | | | |
|---|---|---|---|
| 2006/0082869 A1* | 4/2006 | Uda | H04B 10/2563 359/337 |
| 2007/0077066 A1 | 4/2007 | Nakamoto | |
| 2008/0131116 A1* | 6/2008 | Nakamura | H04B 10/07955 398/34 |
| 2010/0239260 A1* | 9/2010 | Oikawa | H04B 10/07953 398/81 |
| 2011/0081146 A1 | 4/2011 | Nakajima et al. | |
| 2011/0091206 A1* | 4/2011 | He | H04B 10/07953 398/26 |
| 2012/0093501 A1* | 4/2012 | He | H04B 10/07953 398/26 |
| 2013/0330071 A1* | 12/2013 | He | H04B 10/07953 398/16 |
| 2015/0016822 A1* | 1/2015 | Ishikawa | 14/257 |
| 2015/0333863 A1 | 11/2015 | Fujita | |
| 2015/0381276 A1* | 12/2015 | Saito | H04B 10/07957 398/34 |
| 2017/0005726 A1 | 1/2017 | Kim et al. | |

FOREIGN PATENT DOCUMENTS

| | | |
|---|---|---|
| JP | 2007-104008 A | 4/2007 |
| JP | 2011-082749 A | 4/2011 |
| JP | 2014-165751 A | 9/2014 |
| JP | 2015-220553 A | 12/2015 |
| JP | 2017-017705 A | 1/2017 |

OTHER PUBLICATIONS

English translation of Written opinion for PCT Application No. PCT/JP2017/003588.

Extended European Search Report for EP Application No. EP17747457.4 dated Aug. 28, 2019.

Japanese Office Action for JP Application No. 2017-565586 dated May 7, 2019 with English Translation.

* cited by examiner

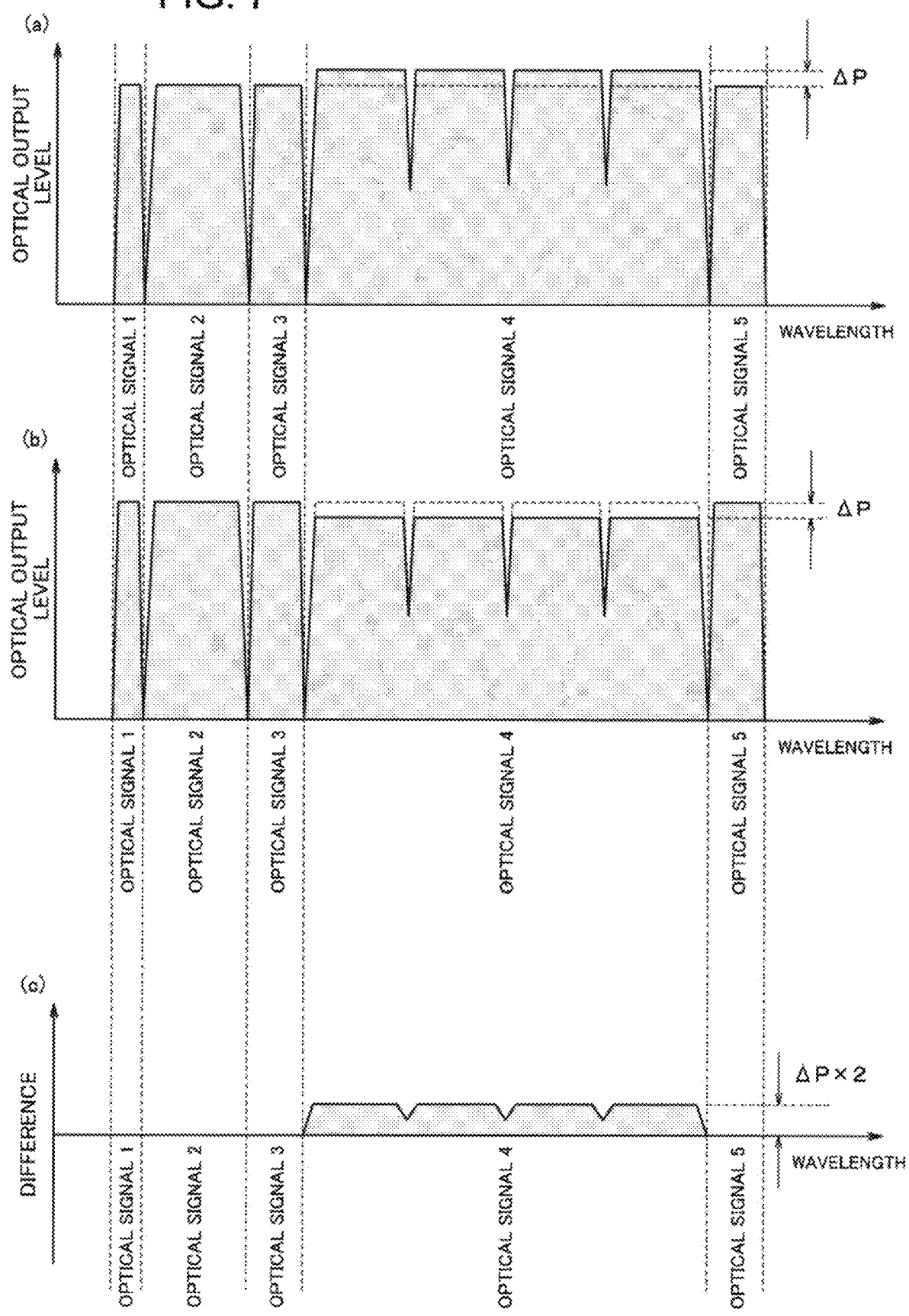

BAND IDENTIFYING CIRCUIT, WAVELENGTH-MULTIPLEXED OPTICAL SIGNAL TRANSMISSION DEVICE, WAVELENGTH-MULTIPLEXED OPTICAL SIGNAL TRANSMISSION SYSTEM, AND BAND IDENTIFYING METHOD

This application is a National Stage Entry of PCT/JP2017/003588 filed on Feb. 1, 2017, which claims priority form Japanese Patent Application 2016-017632 filed on Feb. 2, 2016, the contents of all of which are incorporated herein by reference, in their entirety.

TECHNICAL FIELD

The present invention relates to a band identifying circuit, a wavelength-multiplexed optical signal transmission device, a wavelength-multiplexed optical signal transmission system, and a band identifying method, and more particularly, to a band identifying circuit, a wavelength-multiplexed optical signal transmission device, a wavelength-multiplexed optical signal transmission system, and a band identifying method, which treat a wavelength-multiplexed optical signal subjected to wavelength multiplexing.

BACKGROUND ART

In a wavelength-multiplexed optical signal treated in optical fiber communication, optical signals are orderly arranged according to a wavelength grid defined in an international telecommunication union telecommunication standardization sector (ITU-T) G.692 and are managed by channel numbers. General optical fiber communication, for example, is disclosed in Patent Literatures 1, 2 and the like.

However, in recent years, in optical fiber communication, an increase in a line demand is significant and higher-density multiplexing of optical signals is required. For example, it is proposed to perform large capacity transmission by multiplexing optical signals with high density to a limitation of frequency utilization efficiency by means of a multi-level modulation technology, a wavelength multiplexing technology, a spectrum control technology and the like.

In such high-density multiplexing transmission, with the development of a control technology of transmission waveforms of optical signals and a separation technology due to a digital computation of optical reception signals, a flexible grid, in which optical signals having mutually different bit rates and modulation schemes are transmitted with high density without depending on a wavelength grid, is introduced. Moreover, with the development of an optical wavelength control technology and an optical modulation technology, a multicarrier/super-channel technology, in which one line is transmitted through a plurality of spectrums is performed, is also applied.

CITATION LIST

Patent Literature

[PTL 1] Japanese Unexamined Patent Application Publication No. H9-224016
[PTL 2] Japanese Unexamined Patent Application Publication No. 2011-82749

SUMMARY OF INVENTION

Technical Problem

In high-density multiplexing transmission employing the flexible grid, a wavelength band of an optical signal depends on a bit rate and differs in each wavelength. In other words, a plurality of optical signals constituting a wavelength-multiplexed optical signal have an unequal wavelength interval and are not arranged in a wavelength interval. In this case, since a border of a line is not clear, discrimination of a band occupied by one signal is difficult. Moreover, in high-density multiplexing transmission employing a multi-carrier and a super channel, it is difficult to recognize a band occupied by one line on a spectrum.

The present invention has been made to solve the above problems, and an object of the present invention is to provide a band identifying circuit, a wavelength-multiplexed optical signal transmission device, a wavelength-multiplexed optical signal transmission system, and a band identifying method, by which it is possible to identify occupied bands in a predetermined optical transmitter with high accuracy even when a plurality of optical signals constituting a wavelength-multiplexed optical signal are not arranged in equidistant wavelength intervals as a result of the application of a digital technology, a super channel and the like.

Solution to Problem

In order to achieve the above object, a band identifying circuit according to the present invention includes: an optical intensity control means for changing, by a prescribed level, an optical intensity of an optical signal outputted from a target-of-identification optical transmitter among a plurality of optical signals respectively outputted from a plurality of optical transmitters, constituting a wavelength-multiplexed optical signal, and having mutually different wavelengths; a spectrum acquisition means for measuring an optical intensity of each wavelength of the wavelength-multiplexed optical signal and outputting a result of the measurement as a spectrum; and a band identifying means for identifying a band occupied by the target-of-identification optical transmitter, based on a change amount of the outputted spectrum.

In order to achieve the above object, a wavelength-multiplexed optical signal transmission device according to the present invention includes: a plurality of optical transmitters for respectively outputting a plurality of optical signals having mutually different wavelengths; a multiplexing means for multiplexing the plurality of outputted optical signals and outputting a wavelength-multiplexed optical signal; and the aforementioned band identifying circuit for identifying the band occupied by the target-of-identification optical transmitter.

In order to achieve the above object, a wavelength-multiplexed optical signal transmission system according to the present invention includes: a wavelength-multiplexed optical signal transmission device including a plurality of optical transmitters for respectively outputting a plurality of optical signals having mutually different wavelengths, an optical intensity control means for changing, by a prescribed level, an optical intensity of an optical signal outputted from a target-of-identification optical transmitter among the plurality of outputted optical signals, and a multiplexing means for multiplexing the plurality of optical signals and outputting a wavelength-multiplexed optical signal; and a wavelength-multiplexed optical signal reception device including a reception means for receiving the transmitted wavelength-multiplexed optical signal, a spectrum acquisition means for measuring an optical intensity of each wavelength of the received wavelength-multiplexed optical signal and outputting a result of the measurement as a spectrum, and a band identifying means for acquiring a change amount of the outputted spectrum in synchronization with an operation of the optical intensity control means and identifying a band occupied by the target-of-identification optical transmitter, based on the acquired change amount of the spectrum.

In order to achieve the above object, a band identifying method according to the present invention includes: changing, by a prescribed level, an optical intensity of an optical signal outputted from a target-of-identification optical transmitter among a plurality of optical signals respectively outputted from a plurality of optical transmitters, constituting a wavelength-multiplexed optical signal, and having mutually different wavelengths; measuring an optical intensity of each wavelength of the wavelength-multiplexed optical signal and outputting a result of the measurement as a spectrum; and identifying a band occupied by the target-of-identification optical transmitter, based on a change amount of the outputted spectrum.

Advantageous Effects of Invention

According to the present invention, even when a plurality of optical signals constituting a wavelength-multiplexed optical signal are not arranged in equidistant wavelength intervals as a result of the application of a digital technology, a super channel and the like, it is possible to identify occupied bands in a predetermined optical transmitter with high accuracy.

BRIEF DESCRIPTION OF DRAWINGS

FIG. 7 is a diagram for explaining a procedure in which a wavelength-multiplexed optical signal transmission device 100 according to a second example embodiment identifies an occupied band of a second optical transmitter 300.

EXAMPLE EMBODIMENT

First Example Embodiment

Figure 1:
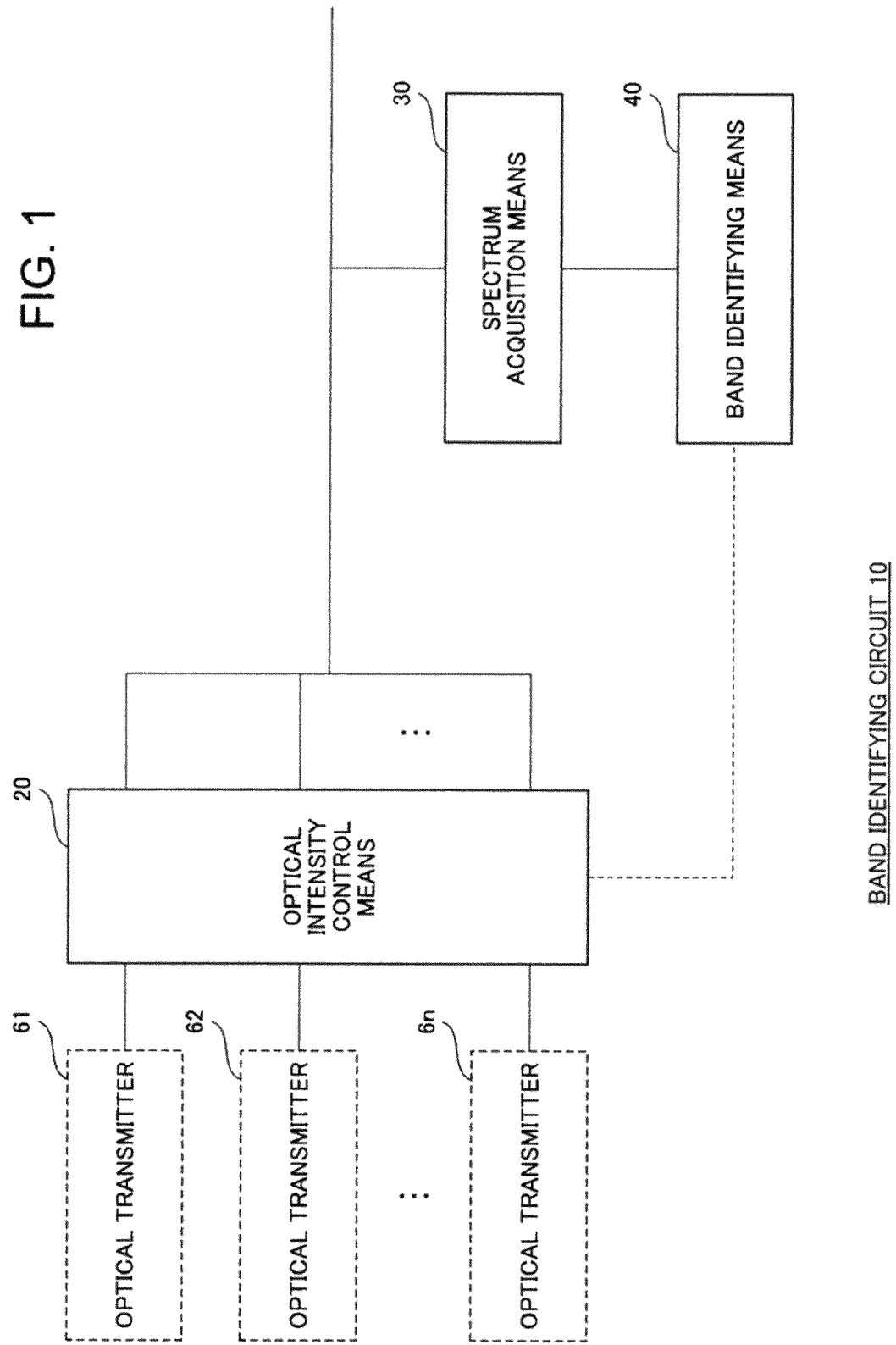
FIG. 1 is a block configuration diagram of a band identifying circuit 10 according to a first example embodiment.

The first example embodiment of the present invention will be described. A block configuration diagram of a band identifying circuit according to the present example embodiment is illustrated in FIG. 1. In FIG. 1, a band identifying circuit 10 includes an optical intensity control means 20, a spectrum acquisition means 30, and a band identifying means 40, and identifies a band occupied by a predetermined optical transmitter $6k$ of n optical transmitters 61, 62 ... $6n$.

The optical intensity control means 20 changes, by a prescribed level, the optical intensity of an optical signal outputted from the target-of-identification optical transmitter $6k$ among optical signals respectively outputted from the plurality of optical transmitters 61, 62 ... $6n$. The optical signals respectively outputted from the plurality of optical transmitters 61, 62 ... $6n$ pass through the optical intensity control means 20, are subjected to wavelength multiplexing, and then are outputted as a wavelength-multiplexed optical signal.

The spectrum acquisition means 30 receives a part of the wavelength-multiplexed optical signal obtained by wavelength-multiplexing the optical signals respectively outputted from the plurality of optical transmitters 61, 62 ... $6n$. The spectrum acquisition means 30 measures the optical intensity of each wavelength of the inputted wavelength-multiplexed optical signal and outputs a result of the measurement as a spectrum.

The band identifying means 40 identifies the band occupied by the target-of-identification optical transmitter $6k$ based on a change amount of the spectrum outputted from the spectrum acquisition means 30.

Specifically, the optical intensity control means 20 according to the present example embodiment increases the optical intensity of the optical signal outputted from the target-of-identification optical transmitter $6k$ by $\Delta P$ from a level when the optical intensity is not controlled. It is assumed that $\Delta P$ is a negligible quantity having no influence on optical signal demodulation. The band identifying means 40 computes a difference between the spectrum after the optical intensity is increased by $\Delta P$ and a spectrum (a spectrum before the optical intensity is increased by $\Delta P$) when the optical intensity is not controlled, in synchronization with the operation of the optical intensity control means 20. Then, the band identifying means 40 identifies a band, in which a result of the computation is $\Delta P$, as the band occupied by the target-of-identification optical transmitter $6k$.

The band identifying means 40 and the optical intensity control means 20 operate by a common timing signal shared by signal lines indicated by dotted lines of FIG. 1. A means for implementing the signal lines is arbitrary. It is preferable that a generation source of the timing signal is the band identifying means 40 performing measurement. That is, the optical intensity control means 20 changes the optical intensity of the optical signal by $\Delta P$ according to the timing signal, and the band identifying means 40 calculates a change amount with a spectrum acquired last time with reference to the same timing signal. Since it is possible to reliably acquire a spectrum after the optical intensity is changed by $\Delta P$ by sharing the timing signal, it is possible to accurately calculate a difference of $\Delta P$.

After increasing the optical intensity of the optical signal outputted from the target-of-identification optical transmitter $6k$ by $\Delta P$, the optical intensity control means 20 can also decrease the optical intensity of the optical signal outputted from the target-of-identification optical transmitter $6k$ by $\Delta P$ from a level when the optical intensity is not controlled. In this case, the band identifying means 40 computes a difference between a spectrum when the optical intensity is increased by $\Delta P$ and a spectrum when the optical intensity is decreased by $\Delta P$. Then, the band identifying means 40 identifies a band, in which a result of the computation is $\Delta P \times 2$, as the band occupied by the target-of-identification optical transmitter $6k$.

The band identifying circuit 10 configured as described above can identify an occupied band in the predetermined optical transmitter $6k$ with high accuracy even when a plurality of optical signals constituting a wavelength-multiplexed optical signal are not arranged in equidistant wavelength intervals as a result of the application of a digital technology, a super channel and the like.

Figure 2:
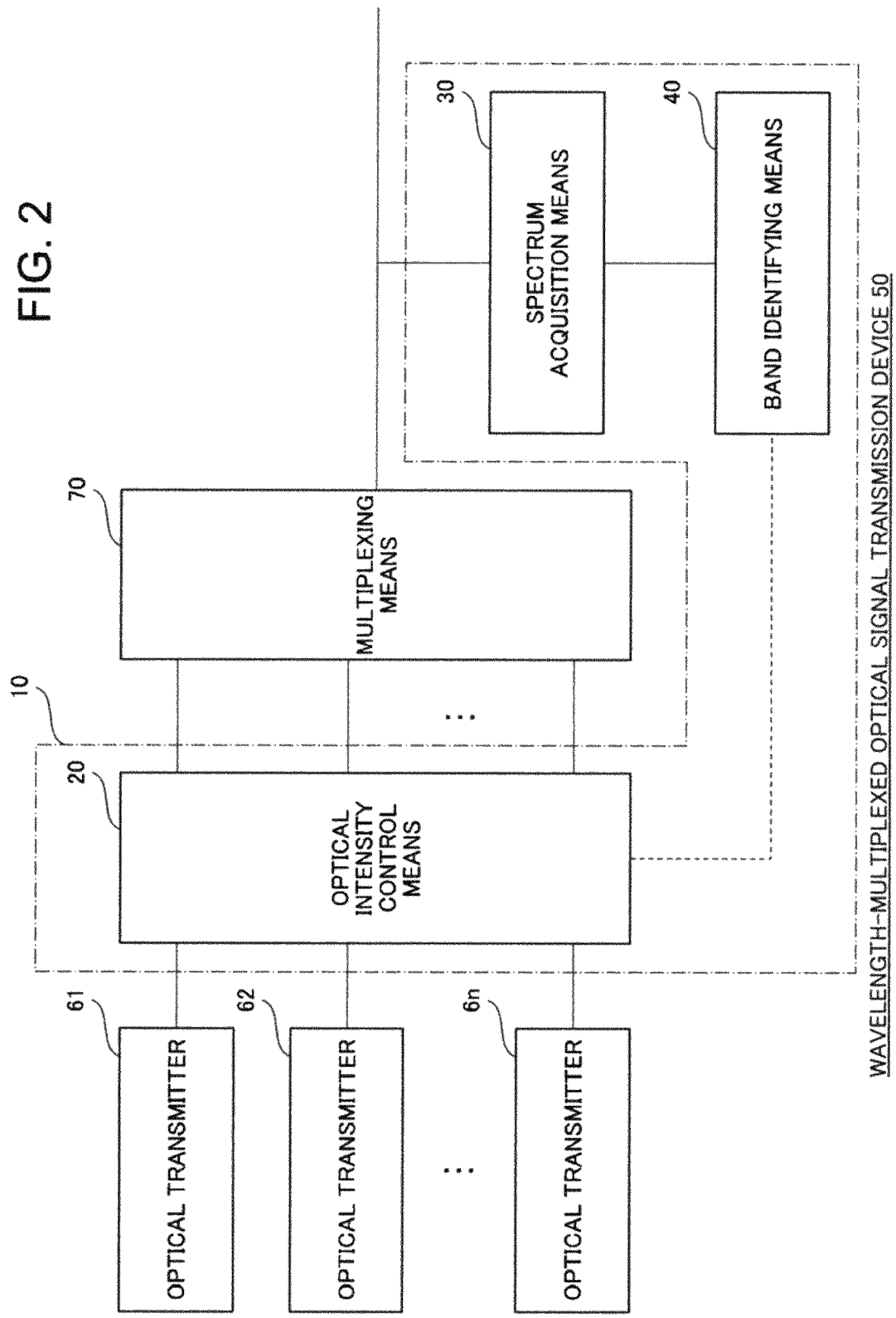
FIG. 2 is a block configuration diagram of a wavelength-multiplexed optical signal transmission device 50 according to a first example embodiment.

The aforementioned band identifying circuit 10 can also be arranged in a wavelength-multiplexed optical signal transmission device. A block configuration diagram of the wavelength-multiplexed optical signal transmission device, in which the band identifying circuit 10 is arranged, is illustrated in FIG. 2. The wavelength-multiplexed optical signal transmission device 50 of FIG. 2 is configured by n optical transmitters 61, 62 . . . 6n, the aforementioned band identifying circuit 10, and a multiplexing means 70.

The optical transmitters 61, 62 . . . 6n respectively output optical signals having mutually different wavelengths.

In the band identifying circuit 10, the optical intensity control means 20 changes, by a prescribed level, the optical intensity of an optical signal outputted from the target-of-identification optical transmitter 6k among optical signals respectively outputted from the optical transmitters 61, 62 . . . 6n.

The multiplexing means 70 wavelength-multiplexes the optical signals outputted from the optical transmitters 61, 62 . . . 6n and passing through the optical intensity control means 20, and outputs a wavelength-multiplexed optical signal.

In the band identifying circuit 10, the spectrum acquisition means 30 measures the optical intensity of each wavelength of the wavelength-multiplexed optical signal outputted from the multiplexing means 70 and outputs a result of the measurement as a spectrum, and the band identifying means 40 identifies a band occupied by the target-of-identification optical transmitter 6k based on a change amount of the spectrum outputted from the spectrum acquisition means 30.

In the aforementioned wavelength-multiplexed optical signal transmission device 50, the band identifying circuit 10 is arranged in such a way that it is possible to identify occupied bands in the predetermined optical transmitter 6k with high accuracy even when a plurality of optical signals constituting a wavelength-multiplexed optical signal are not arranged in equidistant wavelength intervals as a result of the application of a digital technology, a super channel and the like.

Figure 3:
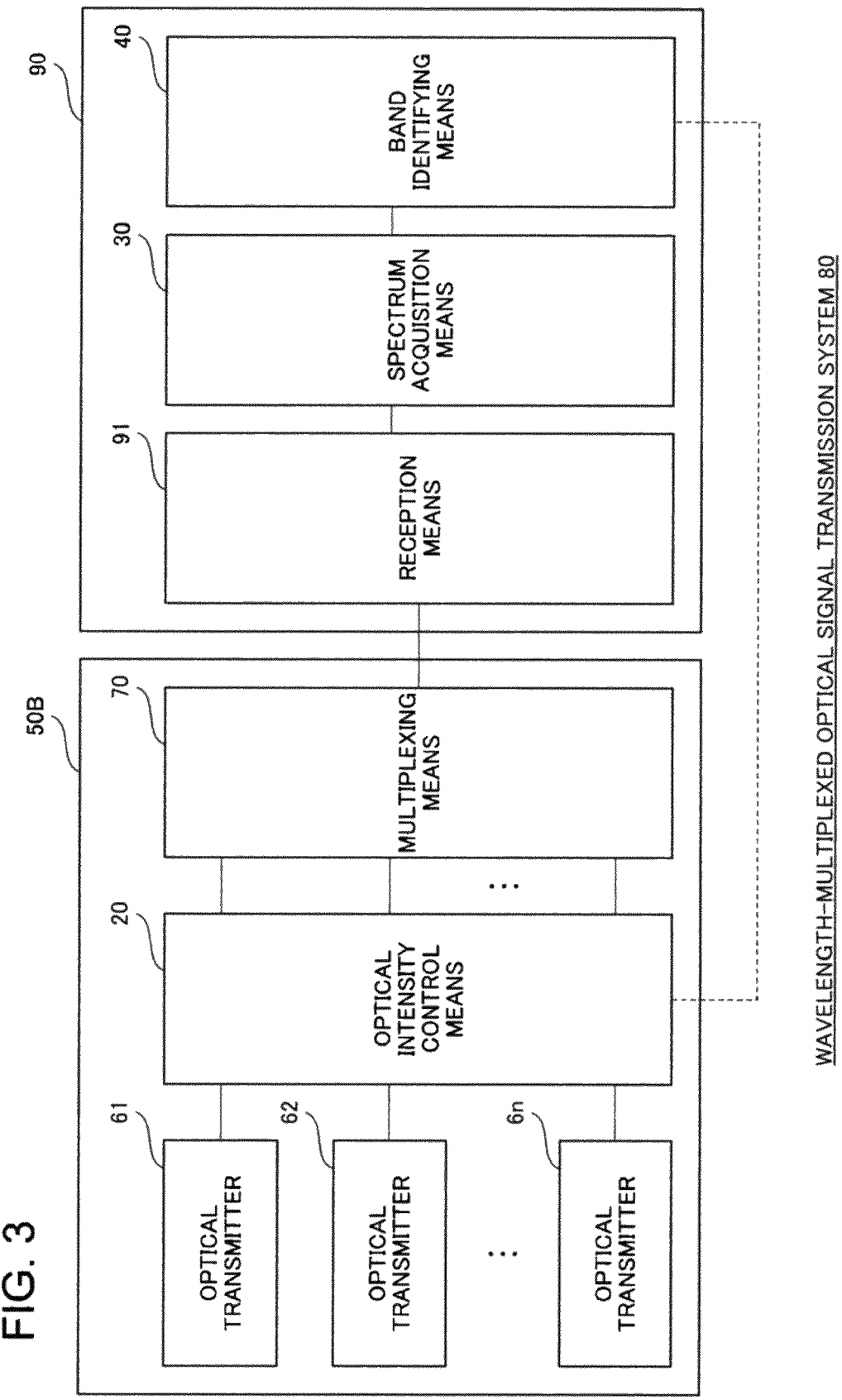
FIG. 3 is a system configuration diagram of a wavelength-multiplexed optical signal transmission system 80 according to a first example embodiment.

Moreover, the functions of the band identifying circuit 10 of FIG. 1 can be provided to a wavelength-multiplexed optical signal transmission device and a wavelength-multiplexed optical signal reception device. In this case, a system configuration diagram of a wavelength-multiplexed optical signal transmission system is illustrated in FIG. 3. A wavelength-multiplexed optical signal transmission system 80 of FIG. 3 is configured by a wavelength-multiplexed optical signal transmission device 50B and a wavelength-multiplexed optical signal reception device 90.

The wavelength-multiplexed optical signal transmission device 50B includes n optical transmitters 61, 62 . . . 6n, the optical intensity control means 20, and the multiplexing means 70. The wavelength-multiplexed optical signal transmission device 50B changes, by a prescribed level, the optical intensity of an optical signal outputted from the target-of-identification optical transmitter 6k, and transmits a wavelength-multiplexed optical signal obtained by wavelength-multiplexing a plurality of optical signals outputted from the optical transmitters 61, 62 . . . 6n in the multiplexing means 70.

The wavelength-multiplexed optical signal reception device 90 includes a reception means 91, the spectrum acquisition means and the band identifying means 40. As the wavelength-multiplexed optical signal reception device 90, for example, an undersea repeater can be applied. The wavelength-multiplexed optical signal reception device 90 receives the wavelength-multiplexed optical signal in the reception means 91, and measures the optical intensity of each wavelength of the received wavelength-multiplexed optical signal and outputs a result of the measurement as a spectrum in the spectrum acquisition means 30. The band identifying means 40 acquires a change amount of the spectrum in synchronization with the operation of the optical intensity control means 20 of the wavelength-multiplexed optical signal transmission device 50B, and identifies a band occupied by the target-of-identification optical transmitter 6k based on the acquired change amount of the spectrum.

The synchronization of the operation of the band identifying means 40 and the operation of the optical intensity control means 20 in FIG. 3 can be performed similarly to that of FIG. 1.

Also in the wavelength-multiplexed optical signal transmission system 80 of FIG. 3, even when a plurality of optical signals constituting a wavelength-multiplexed optical signal are not arranged in wavelength units at equidistant intervals as a result of the application of a digital technology, a super channel and the like, it is possible to identify occupied bands in the predetermined optical transmitter 6k with high accuracy.

Second Example Embodiment

Figure 4:
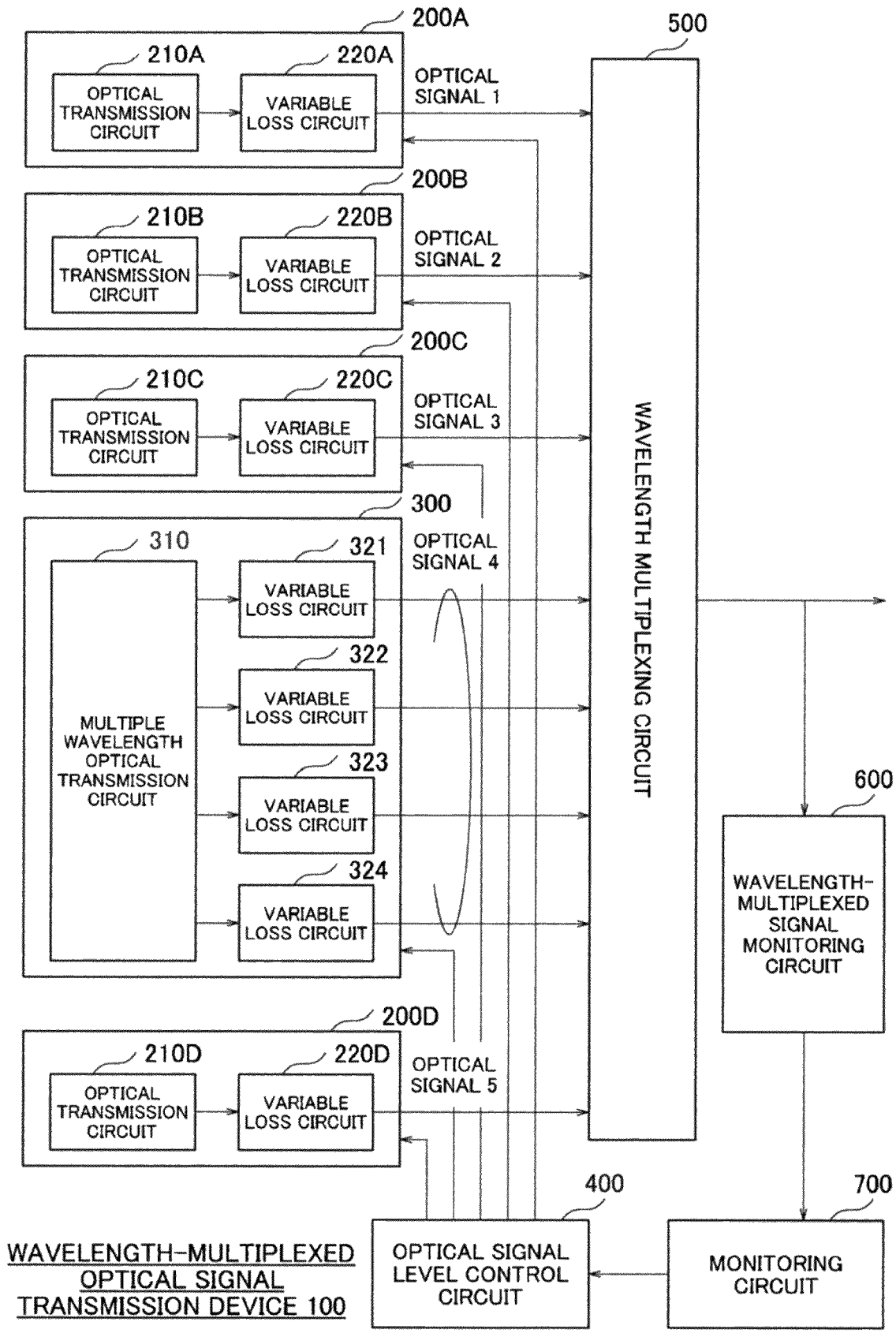
FIG. 4 is a block configuration diagram of a wavelength-multiplexed optical signal transmission device 100 according to a second example embodiment.

The second example embodiment will be described. A block configuration diagram of a wavelength-multiplexed optical signal transmission device according to the present example embodiment is illustrated in FIG. 4. In FIG. 4, a wavelength-multiplexed optical signal transmission device 100 includes four first optical transmitters 200A to 200D, one second optical transmitter 300, an optical signal level control circuit 400, a wavelength multiplexing circuit 500, a wavelength-multiplexed signal monitoring circuit 600, and a monitoring circuit 700. The wavelength-multiplexed optical signal transmission device 100 of FIG. 4 wavelength-multiplexes a plurality of optical signals outputted from the first optical transmitters 200A to 200D and the second optical transmitter 300, and transmits one wavelength-multiplexed optical signal to a transmission path.

The first optical transmitters 200A to 200D respectively include optical transmission circuits 210A to 210D and variable loss circuits 220A to 220D, and generate and output an optical signal having a single wavelength. The first optical transmitter 200A outputs an optical signal 1 of FIG. 5, the first optical transmitter 200B outputs an optical signal 2 of FIG. 5, the first optical transmitter 200C outputs an optical signal 3 of FIG. 5, and the first optical transmitter 200D outputs an optical signal 5 of FIG. 5.

Each of the optical transmission circuits 210A to 210D generates the optical signal by coding an optical carrier.

The variable loss circuits 220A to 220D respectively adjust optical output levels of the optical signals inputted from the optical transmission circuits 210A to 210D, under the control of the optical signal level control circuit 400. The optical signals having passed through the variable loss circuits 220A to 220D are outputted to the wavelength multiplexing circuit 500.

The second optical transmitter 300 includes a multiple wavelength optical transmission circuit 310 and four variable loss circuits 321 to 324, and generates and outputs an optical signal of one line including four subcarriers. The second optical transmitter 300 outputs optical signals 4 of FIG. 5.

The multiple wavelength optical transmission circuit 310 generates four optical signals having mutually different wavelengths by coding four subcarriers having mutually different wavelengths, and outputs the generated optical signals to the variable loss circuits 321 to 324. In the present example embodiment, an optical signal of one line is formed by the four optical signals outputted from the multiple wavelength optical transmission circuit 310.

The variable loss circuits 321 to 324 respectively adjust optical output levels of the optical signals inputted from the multiple wavelength optical transmission circuit 310, under the control of the optical signal level control circuit 400. The optical signals having passed through the variable loss circuits 321 to 324 are outputted to the wavelength multiplexing circuit 500.

The optical signal level control circuit 400 controls the specific variable loss circuits 220A to 220D of the first optical transmitters 200A to 200D and the specific variable loss circuits 321 to 324 of the second optical transmitter 300 based on a control signal inputted from the monitoring circuit 700. The optical signal level control circuit 400 controls the specific variable loss circuits 220A to 220D and 321 to 324 based on the control signal, in such a way that optical signals, whose optical output levels are changed between ±ΔP, are outputted from the controlled variable loss circuits 220A to 220D and 321 to 324.

The wavelength multiplexing circuit 500 wavelength-multiplexes the optical signal having a single wavelength and the optical signal of one line including four subcarriers outputted from the first optical transmitters 200A to 200D and the second optical transmitter 300, thereby outputting a wavelength-multiplexed optical signal. The wavelength multiplexing circuit 500 according to the present example embodiment outputs the wavelength-multiplexed optical signal in which optical signals having mutually different bands are arranged close together in a wavelength direction and have a continuous optical spectrum.

Figure 5:
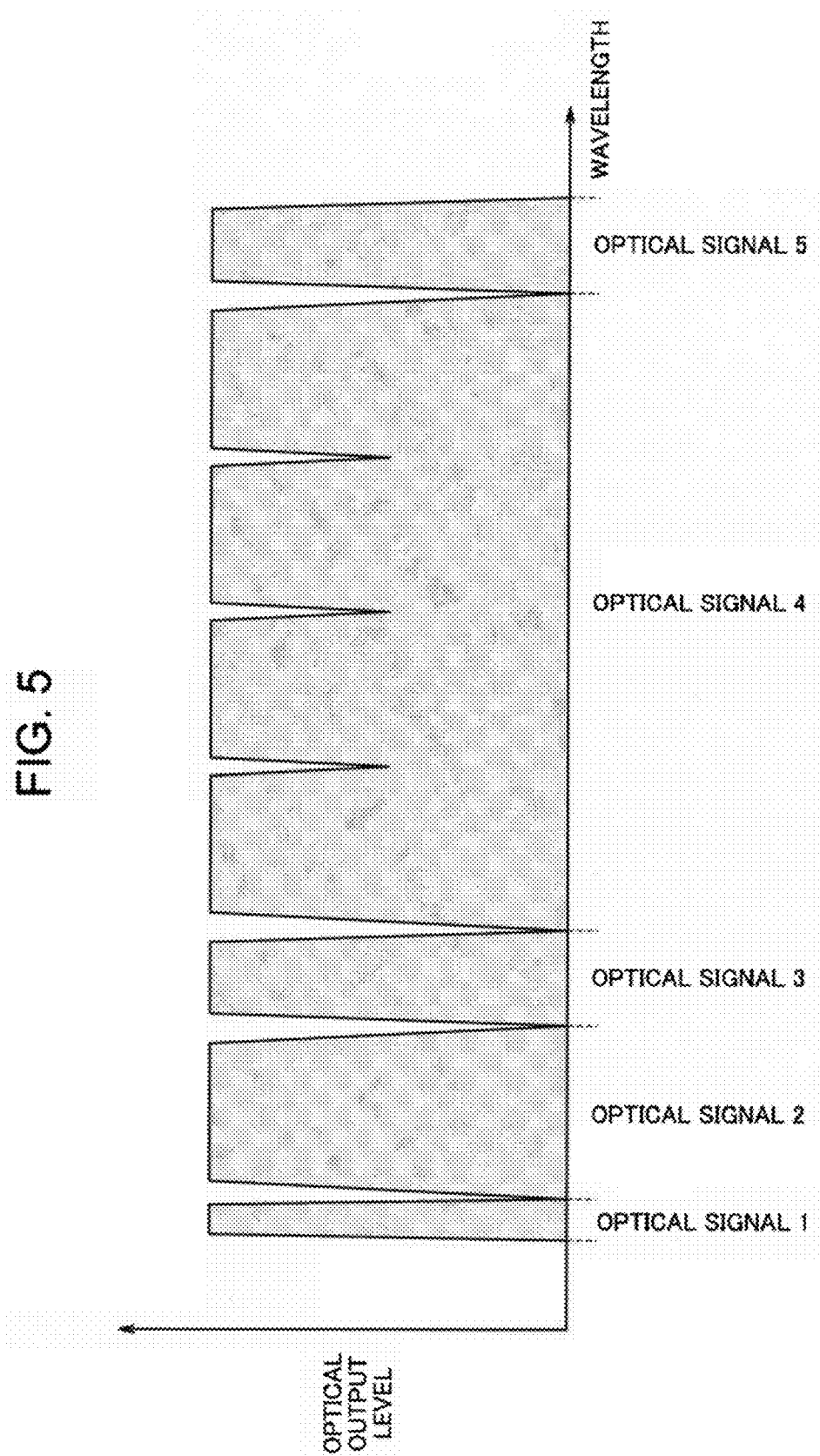
FIG. 5 is an example of a spectrum of a wavelength-multiplexed optical signal outputted from a wavelength multiplexing circuit 500 according to a second example embodiment

An example of the spectrum of the wavelength-multiplexed optical signal outputted from the wavelength multiplexing circuit 500 illustrated in FIG. 5. In the wavelength-multiplexed optical signal illustrated in FIG. 5, wavelength intervals differ in each optical signal. This is because a bit rate and a modulation scheme differ in each optical signal and a wavelength band to be occupied differs in each optical signal. In the wavelength-multiplexed optical signal illustrated in FIG. 5, when a bandwidth of the optical signal 2 outputted from the first optical transmitter 200B is set to 1 (a reference width), the optical signal 1 outputted from the first optical transmitter 200A is ¼ of the band and the optical signals 3 and 5 outputted from the first optical transmitters 200C and 200D are ½ of the band. On the other hand, the optical signal 4 outputted from the second optical transmitter 300 is configured with subcarriers of four waves of the band equal to that of the optical signal 2, but a wavelength interval is narrowed by densification and the band is nearly four times as wide as the optical signal 2.

The wavelength-multiplexed optical signal of FIG. 5 outputted from the wavelength multiplexing circuit 500 is divided into two signals, wherein one wavelength-multiplexed optical signal is outputted to the wavelength-multiplexed signal monitoring circuit 600, and the other wavelength-multiplexed optical signal is transmitted from the wavelength-multiplexed optical signal transmission device 100 to an exterior.

The wavelength-multiplexed signal monitoring circuit 600 measures an optical output level (a spectrum) of an optical signal of each wavelength in the full band of the inputted wavelength-multiplexed optical signal by the control signal inputted from the monitoring circuit 700. The wavelength-multiplexed signal monitoring circuit 600 sweeps the wavelength of the wavelength-multiplexed optical signal, and outputs a spectrum of the wavelength-multiplexed optical signal obtained by the wavelength sweeping to the monitoring circuit 700 as a monitoring result.

The monitoring circuit 700 identifies bands occupied by the desired first optical transmitters 200A to 200D and second optical transmitter 300. For example, when the monitoring circuit 700 identifies a band occupied by a first optical transmitter 200k, the monitoring circuit 700 generates a control signal for controlling an optical output level of and optical signal outputted from the first optical transmitter 200k and outputs the control signal to the optical signal level control circuit 400. Then, the monitoring circuit 700 computes a change amount of the monitoring result inputted from the wavelength-multiplexed signal monitoring circuit 600, thereby identifying the band occupied by the first optical transmitter 200k. The monitoring circuit 700 according to the present example embodiment computes the change amount of the monitoring result in synchronization with the output of the control signal.

In FIG. 4, the monitoring circuit 700 generates a timing signal and hands over the timing signal to the variable loss circuits 220A to 220D of the first optical transmitters 200A to 200D and the variable loss circuits 321 to 324 of the second optical transmitter 300 via the optical signal level control circuit 400. Since the timing signal corresponds to each optical transmitter, it is possible to control optical output of an arbitrary optical transmitter. The first optical transmitters 200A to 200D and the second optical transmitter 300 change the optical intensities of the optical signals 1 to 5 by ΔP by the optical signal level control circuit according to the timing signal. The monitoring circuit 700 receives the spectrum of the wavelength-multiplexed optical signal from the wavelength-multiplexed signal monitoring circuit 600 simultaneously to a change in the optical intensities. The spectrum is received according to the timing signal of the monitoring circuit 700 and is compared with a spectrum received last time in terms of optical intensity, in such a way that a band, in which a change of ΔP occurs, is identified. As a consequence, bands occupied by each optical transmitter are identified.

Figure 6:
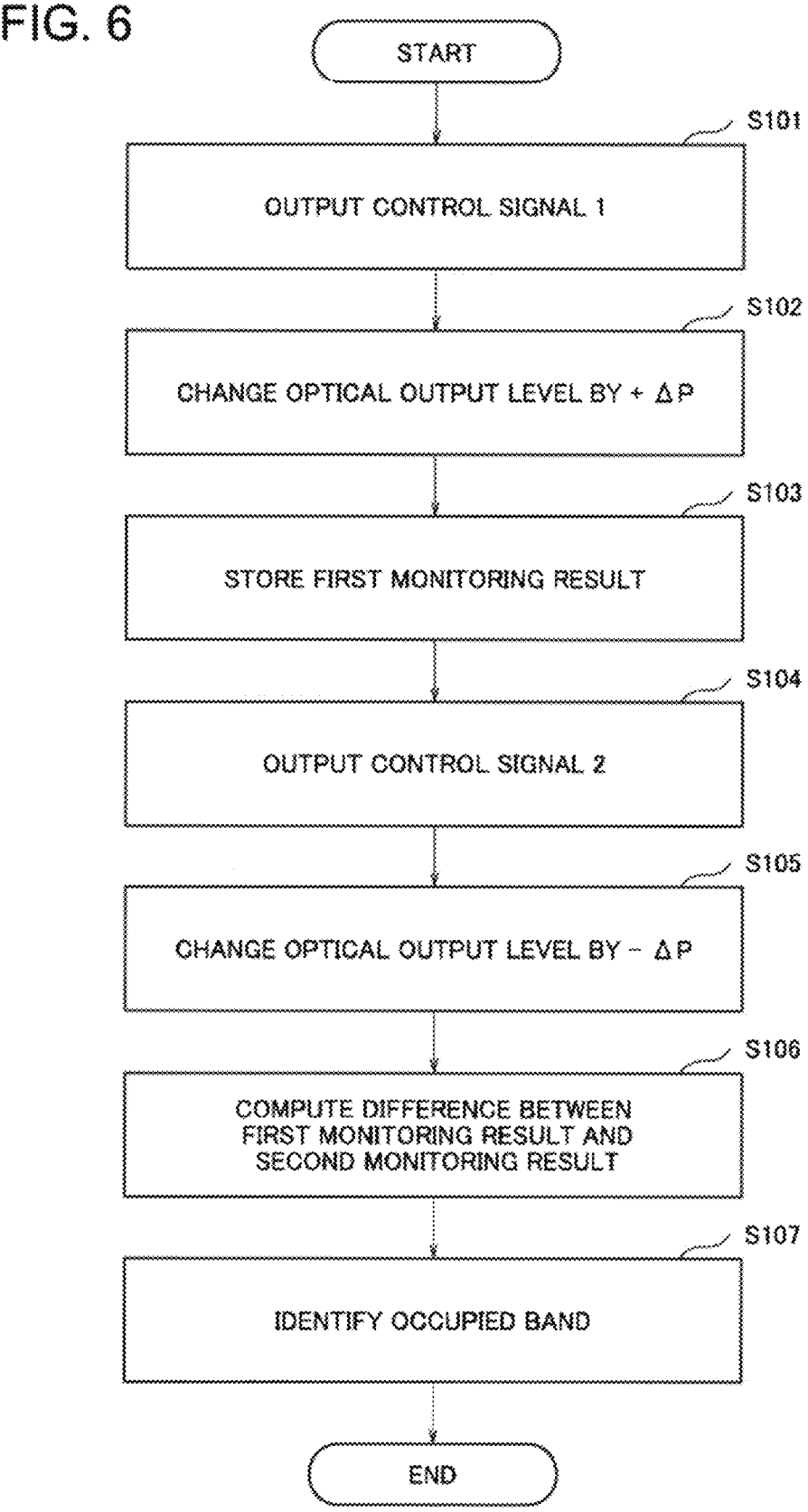
FIG. 6 is an operation flow when a wavelength-multiplexed optical signal transmission device 100 according to a second example embodiment identifies an occupied band of a second optical transmitter 300.

A procedure for identifying bands in the wavelength-multiplexed optical signal transmission device 100 will be described in detail with reference to FIG. 6 and FIG. 7. Hereinafter, a description will be provided for a procedure when the wavelength-multiplexed optical signal transmission device 100 identifies a band occupied by the second optical transmitter 300.

When the monitoring circuit 700 identifies bands occupied by the optical signals 4 outputted from the second optical transmitter 300, the monitoring circuit 700 generates a control signal 1 for changing the optical output levels of the optical signals 4 outputted from the second optical transmitter 300 by +ΔP and outputs the control signal 1 to the optical signal level control circuit 400 (S101).

The optical signal level control circuit 400 controls the variable loss circuits 321 to 324 of the second optical transmitter 300 based on the inputted control signal 1, and respectively changes the optical output levels of four optical signals outputted from the multiple wavelength optical transmission circuit 310 by +ΔP from optical output levels when the optical output levels are not controlled (S102). In this way, the optical output levels of the optical signals 4 outputted from the multiple wavelength optical transmission circuit 310 are changed by +ΔP. The optical signals 4, whose optical output levels have changed by +ΔP, are wavelength-multiplexed with the optical signals 1 to 3 and 5 outputted from the optical transmission circuits 210A to 210D in the wavelength multiplexing circuit 500, and are outputted as a wavelength-multiplexed optical signal.

The wavelength-multiplexed signal monitoring circuit 600 receives a part of the wavelength-multiplexed optical signal outputted from the wavelength multiplexing circuit 500. That is, the wavelength-multiplexed signal monitoring circuit 600 receives the wavelength-multiplexed optical signal including the optical signals 4 whose optical output levels have changed by +ΔP. The wavelength-multiplexed signal monitoring circuit 600 acquires the full band spectrum of the inputted wavelength-multiplexed optical signal and outputs the spectrum to the monitoring circuit 700 as a first monitoring result. An example of the first monitoring result illustrated in FIG. 7 (*a*).

The monitoring circuit 700 stores the inputted first monitoring result (S103). After the first monitoring result is stored, the monitoring circuit 700 generates a control signal 2 for changing the optical output levels of the optical signals 4 outputted from the second optical transmitter 300 by −ΔP and outputs the control signal 2 to the optical signal level control circuit 400 (S104).

The optical signal level control circuit 400 controls the variable loss circuits 321 to 324 of the second optical transmitter 300 based on the inputted control signal 2, and respectively changes the optical output levels of four optical signals outputted from the multiple wavelength optical transmission circuit 310 by −ΔP from optical output levels when the optical output levels are not controlled (S105). In this way, the optical output levels of the optical signals 4 outputted from the multiple wavelength optical transmission circuit 310 are changed by −ΔP. The optical signals 4, whose optical output levels have changed by −ΔP, are wavelength-multiplexed with the optical signals 1 to 3 and 5 outputted from the optical transmission circuits 210A to 210D in the wavelength multiplexing circuit 500, and are outputted as a wavelength-multiplexed optical signal.

The wavelength-multiplexed signal monitoring circuit 600 receives a part of the wavelength-multiplexed optical signal outputted from the wavelength multiplexing circuit 500. That is, the wavelength-multiplexed signal monitoring circuit 600 receives the wavelength-multiplexed optical signal including the optical signals 4 whose optical output levels have changed by −ΔP. The wavelength-multiplexed signal monitoring circuit 600 acquires the overall band spectrum of the inputted wavelength-multiplexed optical signal and outputs the spectrum to the monitoring circuit 700 as a second monitoring result. An example of the second monitoring result illustrated in FIG. 7 (*b*).

The monitoring circuit 700 acquires the second monitoring result and computes a difference between the stored first monitoring result and the newly acquired second monitoring result (S106). The difference between the first monitoring result illustrated in FIG. 7 (*a*) and the second monitoring result illustrated in FIG. 7 (*b*) is illustrated in FIG. 7 (*c*).

As apparent from FIG. 7 (*c*), when the optical output levels of the optical signals 4 outputted from the second optical transmitter 300 by +ΔP and −ΔP, and a difference between the spectrums at this time is computed, a difference among the optical output levels of the optical signals 4 is about ΔP×2. On the other hand, differences among the optical output levels of the optical signal 1 to 3 and 5, for which the optical output levels is not controlled, are offset to one another and becomes nearly zero. Consequently, the monitoring circuit 700 according to the present example embodiment identifies a band, in which the difference between the spectrums is ΔP×2, as a band occupied by the optical signal 4 outputted from the second optical transmitter 300 (S107).

As described above, the wavelength-multiplexed optical signal transmission device 100 according to the present example embodiment controls the variable loss circuits 220A to 220D of the desired first optical transmitters 200A to 200D and the variable loss circuits 321 to 324 of the desired second optical transmitter 300, thereby changing the optical output levels of the optical signals outputted from the desired first optical transmitters 200A to 200D and the desired second optical transmitter 300 by ±ΔP. Then, the wavelength-multiplexed optical signal transmission device 100 computes the difference between the first monitoring result when the optical output level has changed by +ΔP and the second monitoring result when the optical output level has changed by −ΔP, and identifies a band, in which the difference between the optical output levels is ΔP×2, as a band occupied by the optical signals outputted from the desired first optical transmitters 200A to 200D and the second optical transmitter 300.

That is, the monitoring circuit 700 makes synchronization of the generation of the control signal and the acquisition of the monitoring result, changes, by ±ΔP, the optical output levels outputted from the first optical transmitters 200A to 200D and the second optical transmitter 300 (band measurement targets) at a timing before monitoring is started, and computes a difference between spectrums, in such a way that it is possible to easily and accurately identify bands occupied by the desired first optical transmitters 200A to 200D and the second optical transmitter 300.

In the present example embodiment, a case where the wavelength-multiplexed optical signal transmission device 100 includes four first optical transmitters 200A to 200D and one second optical transmitter 300 has been described; however, the number of the first optical transmitters 200A to 200D and the number of the second optical transmitter 300 are not limited thereto. Furthermore, in the wavelength-multiplexed optical signal transmission device, it is also possible to arrange an optical transmitter that outputs an optical signal having a single wavelength, or only an optical transmitter that outputs an optical signal of one line including a plurality of subcarriers.

Moreover, in the present example embodiment, a difference between spectrums, when the optical output levels outputted from the first optical transmitters 200A to 200D and the second optical transmitter 300 (band measurement targets) are changed by ±ΔP, is computed; however, the present invention is not limited thereto. For example, after the optical output levels are changed to a plus side by ΔP, it is also possible to compute a difference between the spectrum illustrated in FIG. 7 (*a*) and the spectrum illustrated in FIG. 5 in the state in which the optical output levels are not controlled. In this case, the monitoring circuit 700 identifies a band, in which the difference between the optical output levels is ΔP, as a band occupied by the optical signals outputted from the desired first optical transmitters 200A to 200D and the second optical transmitter 300.

The present invention is not limited to the aforementioned example embodiments and design changes and the like in the range of not departing from the scope of the present disclosure are also included in the present invention.

Priority is claimed on Japanese Patent Application No. 2016-017632 filed on Feb. 2, 2016, the contents of which are incorporated herein by reference.

REFERENCE SIGNS LIST

10 Band identifying circuit
20 Optical intensity control means
30 Spectrum acquisition means
40 Band identifying means
50, 50B Wavelength-multiplexed optical signal transmission device
61, 62, . . . 6n, 6k Optical transmitter
70 Multiplexing means
80 Wavelength-multiplexed optical signal transmission system
90 Wavelength-multiplexed optical signal reception device
91 Reception means
100 Wavelength-multiplexed optical signal transmission device
200A to 200D First optical transmitter
210A to 210D Optical transmission circuit
220A to 220D Variable loss circuit
300 Second optical transmitter
310 Multiple wavelength optical transmission circuit
321 to 324 Variable loss circuit
400 Optical signal level control circuit
500 Wavelength multiplexing circuit
600 Wavelength-multiplexed signal monitoring circuit
700 Monitoring circuit

What is claimed is:

1. A band identifying circuit comprising:
   an optical intensity controller circuit configured to change, by a prescribed level, an optical intensity of an optical signal outputted from a target-of-identification optical transmitter among a plurality of optical signals respectively outputted from a plurality of optical transmitters, constituting a wavelength-multiplexed optical signal, and having mutually different wavelengths;
   a spectrum acquisition circuit configured to measure an optical intensity of each wavelength of the wavelength-multiplexed optical signal and output a result of the measurement as a spectrum; and
   a band identifier circuit configured to identify a band occupied by the target-of-identification optical transmitter, based on a change amount of the outputted spectrum.

2. The band identifying circuit according to claim 1, wherein the band identifier circuit acquires the change amount of the outputted spectrum in synchronization with an operation of the optical intensity controller circuit.

3. The band identifying circuit according to claim 1, wherein the optical intensity controller circuit increases, by $\Delta P$, the optical intensity of the optical signal outputted from the target-of-identification optical transmitter, and
   the band identifier circuit computes a difference between a spectrum after the optical intensity is increased by $\Delta P$ and a spectrum before the optical intensity is increased by $\Delta P$, and identifies a band, in which a result of the computation is $\Delta P$, as the band occupied by the target-of-identification optical transmitter.

4. The band identifying circuit according to claim 3, wherein the optical intensity controller circuit decreases, by $\Delta P$, the optical intensity of the optical signal outputted from the target-of-identification optical transmitter, and
   the band identifier circuit computes a difference between the spectrum when the optical intensity is increased by $\Delta P$ and a spectrum when the optical intensity is decreased by $\Delta P$, instead of computing the difference between the spectrums before and after the optical intensity is increased by $\Delta P$, and identifies a band, in which a result of the computation is $\Delta P \times 2$, as the band occupied by the target-of-identification optical transmitter.

5. The band identifying circuit according to claim 1, wherein the optical intensity controller circuit comprises:
   a plurality of optical intensity adjuster circuits respectively is arranged in the plurality of optical transmitters configured to change optical intensities of optical signals outputted from corresponding optical transmitters, based on an inputted control signal; and
   a control signal generator circuit configured to generate the control signal for changing the optical intensities by a prescribed level, and output the control signal to the optical intensity adjuster circuits corresponding to the target-of-identification optical transmitter.

6. The band identifying circuit according to claim 5, wherein the optical intensity adjuster circuits are configured by a variable loss circuit.

7. A wavelength-multiplexed optical signal transmission device comprising:
   a plurality of optical transmitters for respectively outputting a plurality of optical signals having mutually different wavelengths;
   a multiplexer configured to multiplex the plurality of outputted optical signals and outputting a wavelength-multiplexed optical signal; and
   the band identifying circuit according to claim 1 configured to identify the band occupied by a target-of-identification optical transmitter.

8. The wavelength-multiplexed optical signal transmission device according to claim 7, wherein the optical transmitters include a first optical transmitter configured to generate and output an optical signal having a single wavelength and/or a second optical transmitter configured to generate and output an optical signal of one line including a plurality of subcarriers.

9. A wavelength-multiplexed optical signal transmission system comprising:
   a wavelength-multiplexed optical signal transmission device including
      a plurality of optical transmitters for respectively outputting a plurality of optical signals having mutually different wavelengths,
      an optical intensity controller circuit configured to change, by a prescribed level, an optical intensity of an optical signal outputted from a target-of-identification optical transmitter among the plurality of outputted optical signals, and
      a multiplexer configured to multiplex the plurality of optical signals and output a wavelength-multiplexed optical signal; and
   a wavelength-multiplexed optical signal reception device including
      a receiver configured to receive the transmitted wavelength-multiplexed optical signal,
      a spectrum acquisition circuit configured to measure an optical intensity of each wavelength of the received wavelength-multiplexed optical signal and output a result of the measurement as a spectrum, and
      a band identifier circuit configured to acquire a change amount of the outputted spectrum in synchronization with an operation of the optical intensity controller circuit and identify a band occupied by the target-of-identification optical transmitter, based on the acquired change amount of the spectrum.

10. A band identifying method comprising:
changing, by a prescribed level, an optical intensity of an optical signal outputted from a target-of-identification optical transmitter among a plurality of optical signals respectively outputted from a plurality of optical transmitters, constituting a wavelength-multiplexed optical signal, and having mutually different wavelengths;
measuring an optical intensity of each wavelength of the wavelength-multiplexed optical signal and outputting a result of the measurement as a spectrum; and
identifying a band occupied by the target-of-identification optical transmitter, based on a change amount of the outputted spectrum.

11. The band identifying circuit according to claim 2, wherein the optical intensity controller circuit increases, by $\Delta P$, the optical intensity of the optical signal outputted from the target-of-identification optical transmitter, and
the band identifier circuit computes a difference between a spectrum after the optical intensity is increased by $\Delta P$ and a spectrum before the optical intensity is increased by $\Delta P$, and identifies a band, in which a result of the computation is $\Delta P$, as the band occupied by the target-of-identification optical transmitter.

12. The band identifying circuit according to claim 11, wherein the optical intensity controller circuit decreases, by $\Delta P$, the optical intensity of the optical signal outputted from the target-of-identification optical transmitter, and
the band identifier circuit computes a difference between the spectrum when the optical intensity is increased by $\Delta P$ and a spectrum when the optical intensity is decreased by $\Delta P$, instead of computing the difference between the spectrums before and after the optical intensity is increased by $\Delta P$, and identifies a band, in which a result of the computation is $\Delta P \times 2$, as the band occupied by the target-of-identification optical transmitter.

13. The band identifying circuit according to claim 2, wherein the optical intensity controller circuit comprises:
a plurality of optical intensity adjuster circuits respectively arranged in the plurality of optical transmitters configured to change optical intensities of optical signals outputted from corresponding optical transmitters, based on an inputted control signal; and
a control signal generator circuit configured to generate the control signal for changing the optical intensities by a prescribed level, and output the control signal to the optical intensity adjuster circuits corresponding to the target-of-identification optical transmitter.

14. The band identifying circuit according to claim 11, wherein the optical intensity controller circuit comprises:
a plurality of optical intensity adjuster circuits respectively arranged in the plurality of optical transmitters configured to change optical intensities of optical signals outputted from corresponding optical transmitters, based on an inputted control signal; and
a control signal generator circuit configured to generate the control signal for changing the optical intensities by a prescribed level, and output the control signal to the optical intensity adjuster circuits corresponding to the target-of-identification optical transmitter.

15. The band identifying circuit according to claim 12, wherein the optical intensity controller circuit comprises:
a plurality of optical intensity adjuster circuits respectively arranged in the plurality of optical transmitters configured to change optical intensities of optical signals outputted from corresponding optical transmitters, based on an inputted control signal; and
a control signal generator circuit configured to generate the control signal for changing the optical intensities by a prescribed level, and output the control signal to the optical intensity adjuster circuits corresponding to the target-of-identification optical transmitter.

16. A wavelength-multiplexed optical signal transmission device comprising:
a plurality of optical transmitters for respectively outputting a plurality of optical signals having mutually different wavelengths;
a multiplexer configured to multiplex the plurality of outputted optical signals and outputting a wavelength-multiplexed optical signal; and
the band identifying circuit according to claim 2 configured to identify the band occupied by a target-of-identification optical transmitter.

17. A wavelength-multiplexed optical signal transmission device comprising:
a plurality of optical transmitters for respectively outputting a plurality of optical signals having mutually different wavelengths;
a multiplexer configured to multiplex the plurality of outputted optical signals and outputting a wavelength-multiplexed optical signal; and
the band identifying circuit according to claim 3 configured to identify the band occupied by a target-of-identification optical transmitter.

18. A wavelength-multiplexed optical signal transmission device comprising:
a plurality of optical transmitters for respectively outputting a plurality of optical signals having mutually different wavelengths;
a multiplexer configured to multiplex the plurality of outputted optical signals and outputting a wavelength-multiplexed optical signal; and
the band identifying circuit according to claim 4 configured to identify the band occupied by a target-of-identification optical transmitter.

19. A wavelength-multiplexed optical signal transmission device comprising:
a plurality of optical transmitters for respectively outputting a plurality of optical signals having mutually different wavelengths;
a multiplexer configured to multiplex the plurality of outputted optical signals and outputting a wavelength-multiplexed optical signal; and
the band identifying circuit according to claim 5 configured to identify the band occupied by a target-of-identification optical transmitter.

20. A wavelength-multiplexed optical signal transmission device comprising:
a plurality of optical transmitters for respectively outputting a plurality of optical signals having mutually different wavelengths;
a multiplexer configured to multiplex the plurality of outputted optical signals and outputting a wavelength-multiplexed optical signal; and
the band identifying circuit according to claim 6 configured to identify the band occupied by a target-of-identification optical transmitter.

* * * * *